United States Patent
Fackrell et al.

(10) Patent No.: US 12,540,759 B2
(45) Date of Patent: Feb. 3, 2026

(54) TWO OPENING DEWAR WITH DESICCANT ANNULUS

(71) Applicant: THE UNITED STATES OF AMERICA, AS REPRESENTED BY THE SECRETARY OF THE NAVY, Arlington, VA (US)

(72) Inventors: Christofer Joseph Fackrell, Monterey, CA (US); Anthony Gerard Pollman, Monterey, CA (US); Douglas Lee Van Bossuyt, Monterey, CA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 345 days.

(21) Appl. No.: 18/198,518

(22) Filed: May 17, 2023

(65) Prior Publication Data

US 2023/0375262 A1   Nov. 23, 2023

Related U.S. Application Data

(60) Provisional application No. 63/343,020, filed on May 17, 2022.

(51) Int. Cl.
| | |
|---|---|
| *F25B 9/14* | (2006.01) |
| *F17C 3/02* | (2006.01) |
| *F17C 3/08* | (2006.01) |
| *F17C 13/08* | (2006.01) |
| *F25B 40/00* | (2006.01) |

(52) U.S. Cl.
CPC ................ *F25B 9/14* (2013.01); *F25B 40/00* (2013.01); *F17C 3/02* (2013.01); *F17C 3/08* (2013.01); *F17C 13/086* (2013.01); *F17C 2203/035* (2013.01); *F25J 2270/908* (2013.01)

(58) Field of Classification Search
None
See application file for complete search history.

(56) References Cited

U.S. PATENT DOCUMENTS 2,329,765 A * 9/1943 Jackson .................... F17C 3/08
 62/46.1
2,900,800 A * 8/1959 Loveday ................... F17C 3/08
 220/592.27

(Continued)

FOREIGN PATENT DOCUMENTS

CN        104350323 A  *  2/2015  ............. B01D 53/02
DE   102004060591 A1  *  7/2006  ................ F17C 3/04

(Continued)

OTHER PUBLICATIONS

CN-104350323-A English Machine Translation (Year: 2015).*
DE-102016007318-A1 English Machine Translation (Year: 2017).*
DE_102008054090_A1 English Machine Translation (Year: 2010).*

*Primary Examiner* — Jenna M Maroney
(74) *Attorney, Agent, or Firm* — Heber Martin Carbajal Chavez; Scott Bell

(57) ABSTRACT

A dewar includes two coaxial openings of different sizes (e.g., to allow for interfacing with a Stirling cryocooler and a Stirling generator), a polytetrafluoroethylene or glass inner chamber (e.g., to reduce conductive heat transfer, particularly through the dewar neck), and an integrated, annular desiccant ring (e.g., for drying low-pressure, ambient air).

19 Claims, 14 Drawing Sheets

(56) References Cited

U.S. PATENT DOCUMENTS

| | | | | | |
|---|---|---|---|---|---|
| 3,108,706 | A | * | 10/1963 | Matsch | H01J 19/28 |
| | | | | | 220/592.27 |
| 3,532,473 | A | * | 10/1970 | Biegler | B01J 2/12 |
| | | | | | 264/117 |
| 4,674,289 | A | * | 6/1987 | Andonian | F17C 9/00 |
| | | | | | 62/47.1 |
| 4,899,546 | A | * | 2/1990 | Eigenbrod | F17C 13/085 |
| | | | | | 62/50.2 |
| 4,918,927 | A | * | 4/1990 | Eigenbrod | F17C 9/00 |
| | | | | | 220/560.12 |
| 4,988,014 | A | * | 1/1991 | Varghese | F17C 3/08 |
| | | | | | 220/560.12 |
| 6,708,502 | B1 | * | 3/2004 | Aceves | F17C 3/08 |
| | | | | | 220/560.08 |
| 6,725,683 | B1 | * | 4/2004 | Laskaris | F25B 23/006 |
| | | | | | 165/104.21 |
| 2019/0137163 | A1 | * | 5/2019 | Corey | F25D 23/003 |
| 2022/0042478 | A1 | * | 2/2022 | Bailey | F25J 1/0012 |
| 2023/0375262 | A1 | * | 11/2023 | Fackrell | F25B 40/00 |
| 2024/0191912 | A1 | * | 6/2024 | Fackrell | F17C 13/001 |

FOREIGN PATENT DOCUMENTS

| | | | | | |
|---|---|---|---|---|---|
| DE | 102008054090 | A1 | * | 5/2010 | F17C 3/08 |
| DE | 102014213958 | A1 | * | 1/2016 | F17C 13/02 |
| DE | 102016007318 | A1 | * | 12/2017 | |
| EP | 2877776 | B1 | * | 2/2019 | F17C 3/02 |
| EP | 4108975 | A1 | * | 12/2022 | F17C 3/02 |

* cited by examiner

TWO OPENING DEWAR WITH DESICCANT ANNULUS

CROSS-REFERENCE TO RELATED APPLICATIONS

The present application claims priority to U.S. Provisional Patent Application Ser. No. 63/343,020, filed May 17, 2022, which is incorporated by reference herein in its entirety.

BACKGROUND

Islanded, renewable micro-grids suffer from intermittent energy generation which necessitates use of some type of energy storage. Liquid air energy storage is one promising solution. Liquid air energy storage uses energy generated in excess of immediate demand to run a cycle or process to liquify ambient air and store it in an insulated container or dewar. Then, when demand exceeds generation on the islanded microgrid, the liquid air is used to run a cycle or process to generate electrical energy.

Liquid air energy storage is currently an industrial-sized process, and typically utilizes a high-pressure thermodynamic cycle such as Linde-Hampson for liquification and a high-pressure thermodynamic cycle such as Rankine for energy recovery. These processes do not scale-down well.

A recent patent application by Bailey et al., published as US 2022/0042478 A1 on Feb. 10, 2022 and which is incorporated by reference herein in its entirety, suggested using a Stirling cycle for liquification and a Stirling cycle for energy generation. The application calls for a free-piston Stirling engine and free-piston Stirling generator to both be located at the mouth of a single, traditional dewar. A dewar is a vessel designed to store cryogenic fluids by minimizing heating of the stored fluid by conduction, convection, and radiative heat transfer, which causes evaporation of the liquified air (LA), preventing its stored energy from being used for other applications. In its simplest form, a dewar has an inner and outer wall with a vacuum drawn between them to minimize thermal conductivity, a low emissivity reflective radiation shield to minimize radiative heating, and a lid or stopper at the mouth of the dewar to minimize the vapor mass flow rate of the stored liquid as it evaporates, thus limiting thermal convection. Atmospherically vented storage dewars typically use a long and narrow neck, as this lowers the overall heat flux conducted down the neck, reducing the LA evaporation rate. Additionally, typical storage dewars contain a spherical or semi-spherical storage area to maximize the volume of LA to the physical surface area of the dewar's material in contact with the LA. This reduces conductive losses of the LA. The wide mouth dewar design used by Bailey et al., necessary to support a Stirling cryocooler and generator in a single opening, increases the convection energy losses compared to narrow neck dewar variants and relies on an extended cold side of the Stirling generator to be in contact with LA throughout the storage volume, which also increases conduction due to its continuous contact with the stored LA.

The free-piston Stirling generator would operate using a long, high-thermal-conductivity cold finger that extends from the generator, into pooled liquid air, and to the bottom of the dewar. This design did not dry the incoming air, which is necessary for preventing a frost layer from building up on the Sterling cold finger which reduces heat transfer and degrades efficiency. In addition, this design requires a wide-mouthed dewar to make room for all of the equipment located at the top and penetrating into the vapor space or liquid air. Wide-mouthed (or wide-necked) dewars suffer from greater heat loss than the narrow variants.

Historically, electrical grid energy sources have primarily come from fossil fuel based regional power stations, with backup sources of electrical power at an installation or facility level also relying on fossil fuel based energy, most commonly taking the form of emergency diesel generators (EDGs). This energy distribution model does not work when a regional powergrid is unavailable, such as remote research stations. Over the last several years there has been an increased interest regarding remote, islanded, and renewable energy microgrids for use in remote locations, allowing for a reduction in logistics burdens associated with fossil fuel based electrical power sources. The Department of Energy (DOE) defines a microgrid as "a group of interconnected loads and distributed energy resources within clearly defined electrical boundaries that acts as a single controllable entity with respect to the grid. A microgrid can connect and disconnect from the grid to enable it to operate in both grid-connected or islanded-mode." This definition can be modified to define a remote, islanded microgrid as one that does not connect to a larger, regional power grid. Furthermore, a remote, islanded, and renewable microgrid is one that supplies the majority of its electrical power from renewable sources, such as wind and solar. While these type of microgrids aim to address electrical energy supply issues for isolated locations, the energy generated by them is intrinsically intermittent due to the microgrid's reliance on renewable energy sources, which are often cyclic in their energy production (e.g., photovoltaic cells only producing electrical power at night). This can be mitigated with energy storage, which enables electrical power to be sent to islanded, renewable microgrids when their renewable energy sources are incapable of meeting the grid's electrical power demands.

Energy storage on microgrids during power interruption presents its own problems. Typically, when a renewable energy power source supplies electrical power that is greater than the grid's electrical demand, the electrical supply is metered down, as is the case of wind turbines, or it is rejected as heat via a resister bank for non-adjustable sources such as photovoltaic cells; however, with attached microgrid energy storage this excess electrical power can be used to store energy for later use. Several generalized types of energy storage systems exist, including electrical, mechanical, thermal, chemical, electrochemical, and magnetic; each of these solutions has their own set of advantages and disadvantages, including cost, size, energy density, efficiency, lifespan, charging rate, reliability, ease of use, environmental impact, life cycle cost, and disposability. Additionally, depending on the storage method, the energy recovery options are limited, with each option having its own advantages and disadvantages.

Typically, liquid air energy storage (LAES) systems are used for large or industrial-scale applications due to inefficiencies in liquifying air, which use one, or a combination of, several thermo-dynamic cycles, such as the Linde Hampson, Claude, mixed refrigerant, and Solvay cycles. However, at smaller-scales, which would be viable on an islanded microgrid, these traditional LAES systems use liquification and power-recovery cycles that are inappropriate due to excessive electrical power requirements for LA production and the immense size of their components. Due to these electrical power and size considerations, other liquification options are considered. This consideration at the microgrid level is made due to LA's high energy density and lack of geographic placement requirements like many similar renewable energy capture and storage techniques, such as compressed air energy storage (CAES) and pumped hydro. The most common low-power liquification options, which are capable of being effectively power by an islanded microgrid, include the Stirling, pulse tube, Gifford-McMahon, Brayton, and Joule-Thomson cycles. This combination of unfettered access to air, coupled with a high energy density, makes investigation into LAES for remote, islanded, renewable microgrids a useful endeavor.

Previous work on small-scale LAES has primarily focused on feasibility, modeling, or component performance analyses. Building on the work of Joshi and Patel, and Howe et al., Willis et al. modeled a small-scale liquid air energy storage and expansion system using a process modeling and simulation software common to the oil and gas industry. Girouard et al. and Fredrickson et al. proposed component selection for a scaled-down version of an industrial LA energy storage process. These investigations showed that turbine and other similar industrial level technologies do not scale well, and subsequent analyses focused on cycles and technologies that were more promising for small-scale applications, agreeing with work presented by Damak et al. Two of these promising small-scale energy recovery methods are a Stirling generator, using a Stirling cycle, and a thermoelectric generator, leveraging the Peltier effect. The patent application for a dual Stirling cycle liquid air battery by Bailey et al. uses a wide mouth dewar that contains a lower-power Stirling cryocooler for liquefaction and Stirling generator power recovery. This combination of Stirling cycles provides a low-power method of producing LA at atmospheric pressure, while allowing for the recovery of electrical power from the LA at the same atmospheric pressure.

It would be beneficial to develop new dewar designs that may be efficacious in improving energy extraction from LA for small-scale LAES applications connected to a microgrid using a non-pressurized LA storage and energy recovery system.

BRIEF DESCRIPTION

The present disclosure relates to a dewar to implement a table-top or small-scale liquid air energy battery using a Stirling cryocooler for liquefaction and a Stirling generator for electrical energy production.

Disclosed, in some embodiments, is a system using a dewar, the system including: a cryocooler to cool a tip of a cold head to cryogenic temperatures, the cryocooler further including: a heat sink to reject heat from the cryocooler, a cold head that protrudes into the dewar through an upper cryocooler cavity, the cold head to condense ambient air to create liquified air in the dewar; the dewar to hold the liquified air at low temperatures, the dewar having the cryocooler cavity and a Stirling cavity that are coaxial, wherein the dewar further includes: a polytetrafluoroethylene or glass inner shell that reduces conductive heat transfer through a neck of the dewar, and an integrated, annular ring fitted in the cryocooler cavity and filled with desiccant, the integrated, annular ring for drying low-pressure, ambient air; and a Stirling engine to drive an electronic generator, the Stirling engine further including: a cold finger protruding into the dewar through the lower Stirling cavity, the cold finger to move the liquified air from the dewar to a Stirling heat sink, the Stirling heat sink to expand the liquified air and to drive the electronic generator, and the electronic generator to generate output electricity.

In accordance with one aspect of the disclosure, the inner shell may be wrapped in metal foil.

In some embodiments, an air gap between the inner shell and an outer shell is maintained.

The dewar may further include a high thermal conductivity plug at the lower Stirling cavity.

In some embodiments, the dewar further includes an integrated, annular desiccant ring.

The dewar further may further include first air holes in an outer shell at the integrated, annular ring and second air holes in the inner shell at the integrated, annular ring.

Disclosed, in other embodiments, is a dewar including: a top opening; a bottom opening; an inner shell that reduces conductive heat transfer, wherein the inner shell comprises polytetrafluoroethylene or glass; an outer shell; a gap between the inner shell and the outer shell; and a desiccant ring.

The desiccant ring may extend around a polytetrafluoroethylene or glass lip above a polytetrafluoroethylene or glass shelf.

In some embodiments, the dewar further includes a polytetrafluoroethylene or glass disk extending around the bottom opening.

The desiccant ring may include silica beads.

In some embodiments, the outer shell includes polytetrafluoroethylene or steel.

Disclosed, in further embodiments, is a system including: a dewar having: a top opening; a bottom opening; an inner shell that reduces conductive heat transfer, wherein the inner shell comprises polytetrafluoroethylene or glass; an outer shell; a gap between the inner shell and the outer shell; and a desiccant ring; a cryocooler associated with the top opening; and a generator associated with the bottom opening.

The cryocooler may be a Stirling cryocooler.

In some embodiments, the generator is a Stirling generator or a thermoelectric generator.

The desiccant ring may extend around a polytetrafluoroethylene or glass lip above a polytetrafluoroethylene or glass shelf.

In some embodiments, the inner shell, the outer shell, the lip, and the shelf comprise polytetrafluoroethylene and are a unitary structure.

The gap may be a vacuum gap.

Still other objects of the disclosure will become apparent upon a reading and understanding of the following detailed description

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1A:
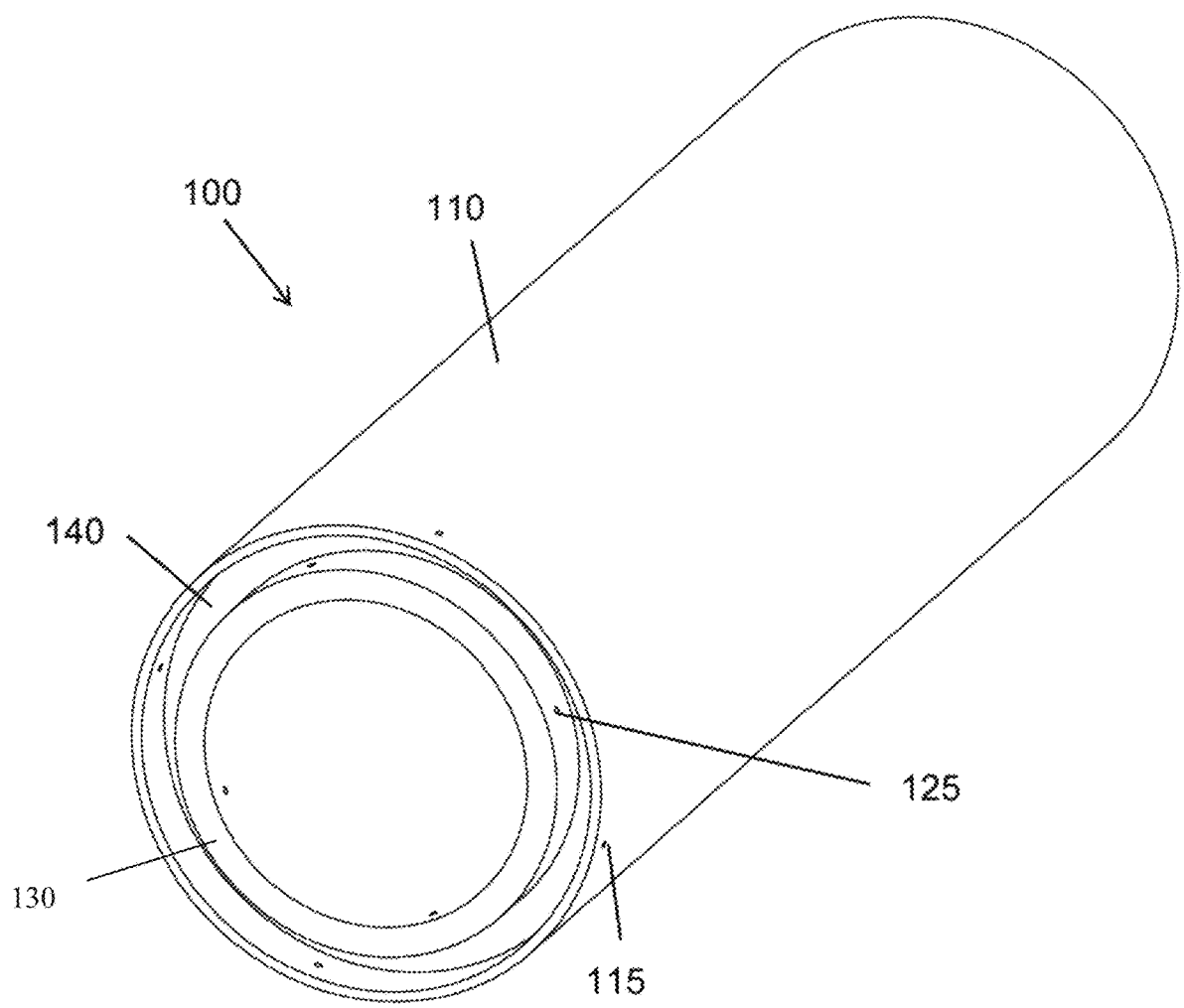
FIG. 1A is a front perspective view of a dewar in accordance with some embodiments of the present disclosure.
Figure 1B:
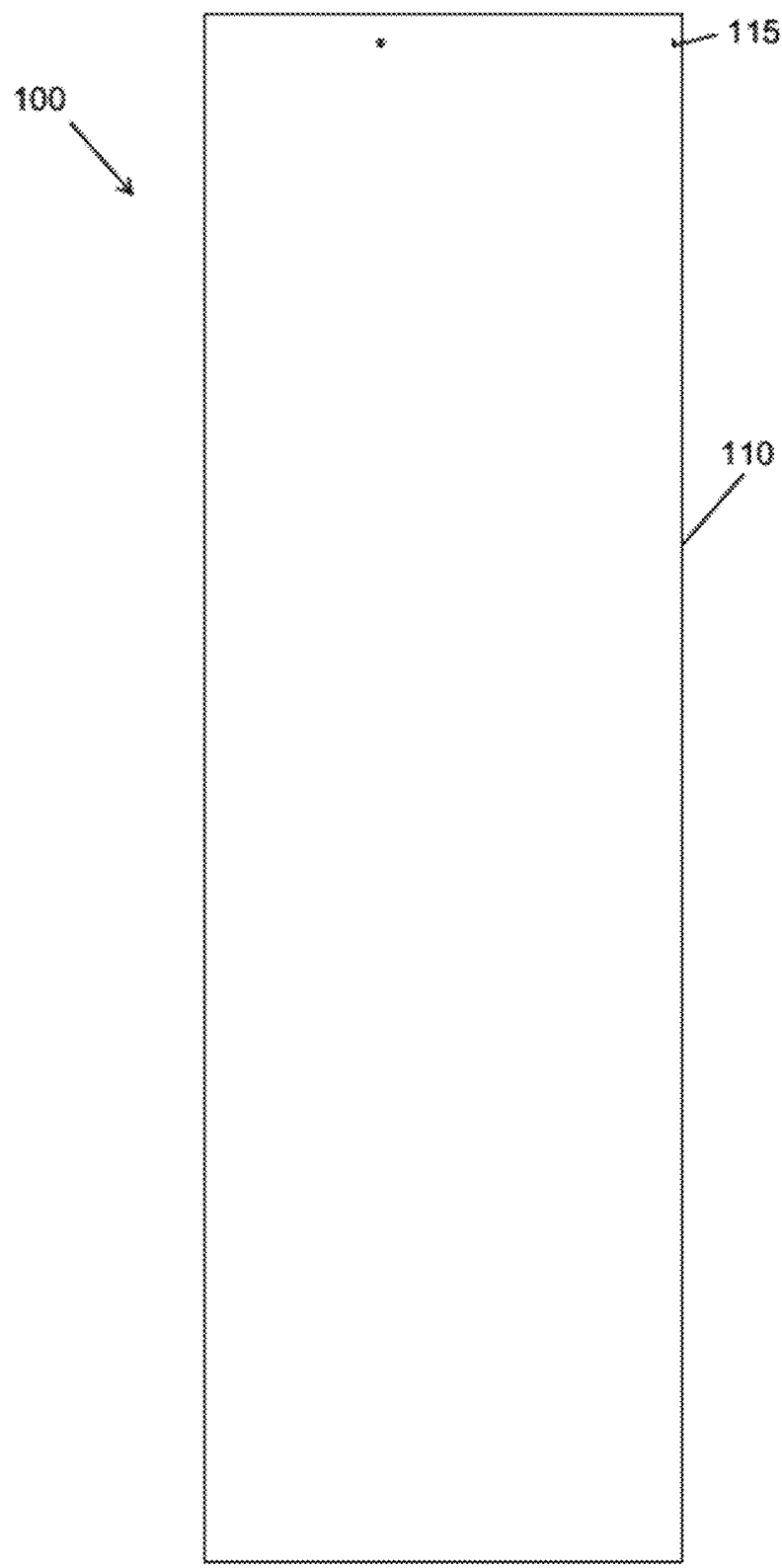
FIG. 1B is a side view of the dewar of FIG. 1A.
Figure 1C:
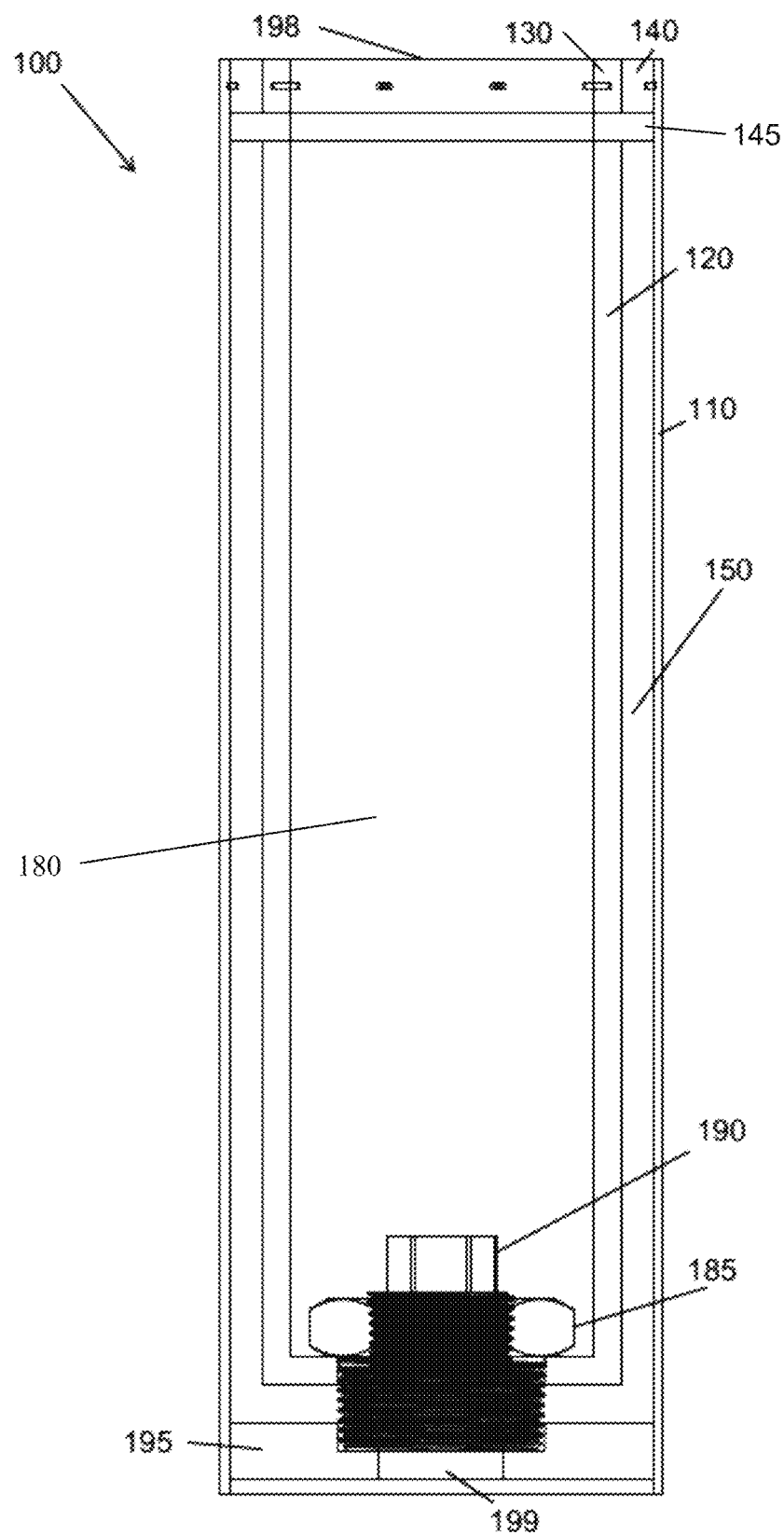
FIG. 1C is a side cross-sectional view of the dewar of FIG. 1A-B.
Figure 1D:
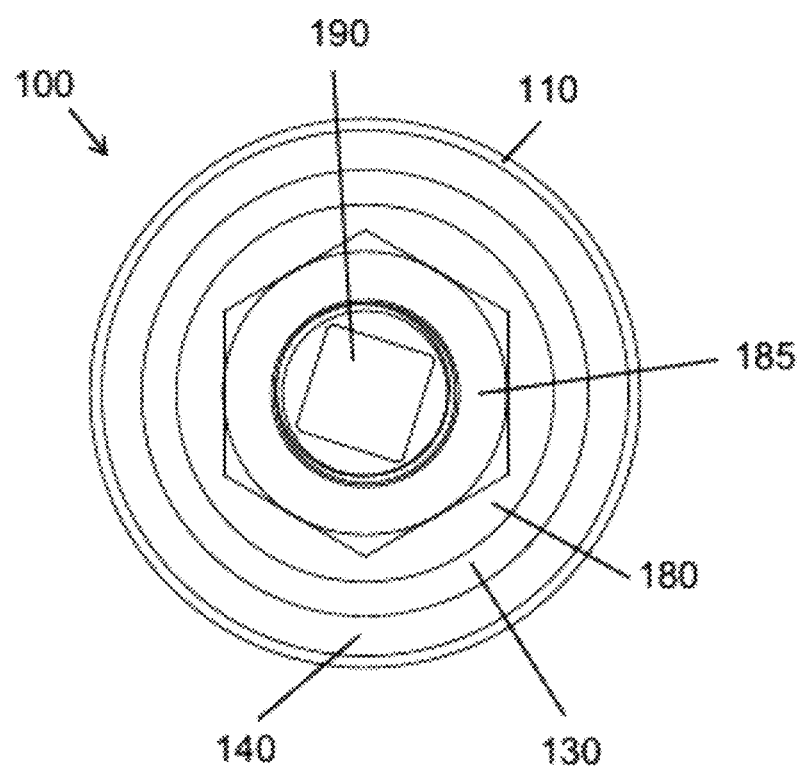
FIG. 1D is a top view of the dewar of FIG. 1A-C.
Figure 1E:
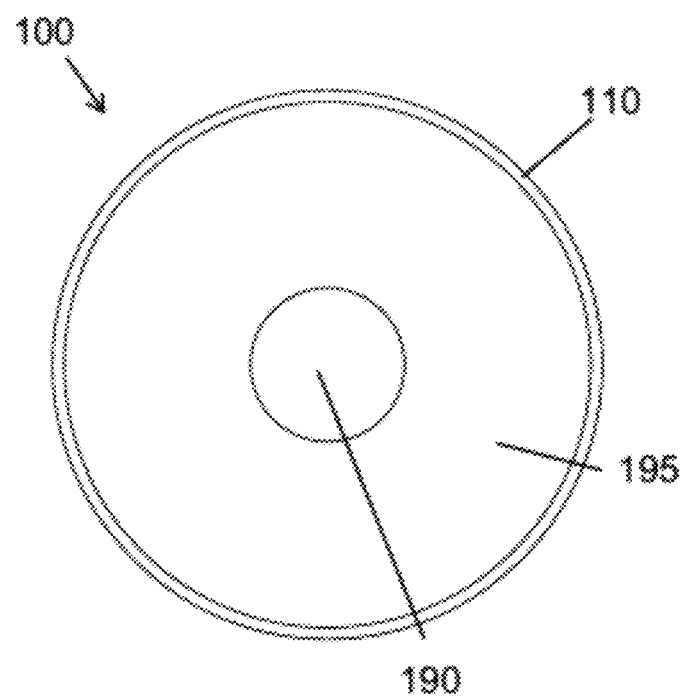
FIG. 1E is a bottom view of the dewar of FIG. 1A-D.

The present disclosure may be understood more readily by reference to the following detailed description of desired embodiments included therein, the drawings. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to a two opening dewar, with a top opening configured to be associated with a cryocooler to produce LA and a second penetration of the dewar at the bottom used for a power recovery cycle. This design reduces the width of the upper dewar neck, reducing convection from the surface of the LA while also reducing the higher conductivity associated with a wider dewar mouth. The lower port allows for energy extraction from the LA's entire stored volume as it evaporates without the need for an extended cold side for an attached Stirling generator. Additionally, this dewar configuration could be adapted to other low pressure energy recovery methods, such as a thermoelectric generator.

FIGS. 1A-E illustrate a coaxial, two-opening dewar 100, with one hole at the top and another at the bottom, for implementing a low-pressure, small-scale, Stirling-Stirling liquid air energy battery. The dewar 100 includes an outer shell 110 including outer air holes 115, an inner shell 120 including inner air holes 125, an upper lip 130, an annular desiccant ring 140, an air gap 150 between the inner shell 120 and the outer shell 110, a vapor space 180, a bushing 185, a plug 190, a disk 195, a cryocooler interface 198, and a generator interface port 199.

A free piston Stirling cryocooler liquefies air that has been dried with an integrated annular desiccant ring. The liquefied air falls through the dewar vapor space and pools at the bottom of the vessel. The thermal cylinder head of a free piston Stirling generator passes through the bottom of the vessel and interfaces with a high thermal conductivity bushing and plug that conducts thermal energy from the pooled liquid to the generator.

The interior of the dewar, or inner shell, is preferably made of polytetrafluoroethylene (e.g., TEFLON®) or glass. Although polytetrafluoroethylene is specifically mentioned herein, it should be understood that other fluoropolymers are also contemplated in this disclosure. The top of the inner chamber may have a polytetrafluoroethylene or glass lip and a polytetrafluoroethylene or glass shelf 145, which creates a groove when mated with the outer shell. The outer shell may be formed from steel, polytetrafluoroethylene, or glass. This groove may be filled with desiccant pellets, thus implementing an integrated annular desiccant ring. Four holes, at 90° intervals, are present at the top of the outer shell. Off-set by 45°, four more holes are also present at the top of the polytetrafluoroethylene inner shell above the polytetrafluoroethylene shelf. Thus, dry air is ingested into the device to replace the air that has been liquefied by the Stirling Cryocooler. Stirling cryocoolers may be beneficial because they have the lowest floor for power usage of cryogenic coolers, which is beneficial for connection to renewable, small-scale grids and some other applications. However, it should be understood that other types of cryocoolers are also contemplated and part of the present disclosure.

Polytetrafluoroethylene has favorable properties for cryogenic temperatures. Namely, polytetrafluoroethylene, as a thermal insulator, will reduce conductive heat transfer radially, as well as from the inner to the outer vessel via the dewar neck (a major source of losses in a traditional dewar). The lower portion of the inner chamber is threaded, and a plugged bushing (both made of high thermal conductive material) passes through the dewar air gap 150. This assembly serves as an interface for a Stirling generator. A countersunk, threaded polytetrafluoroethylene or glass disk interfaces with the bottom of the bushing in such a way as to create an air gap 150 between the outer shell and the polytetrafluoroethylene inner shell. The outer shell slides over the disk at the bottom and over the annular shelf at the top. These serve as the only contact points for the outer shell. The gap could also be a vacuum gap.

The inner shell may be associated with a metal layer. For example, the inner shell may be wrapped in shiny, reflective foil to reduce radiative heat transfer. Alternatively, a metallic coating (e.g., a silver/mirrored paint) may be applied. The wrapped/coated inner shell is surrounded by a stagnant air gap 150 or vacuum to reduce convective heat transfer. The gap is created by separation between the outer shell and the covered inner shell.

Features with links to the intended function include: the dewar has two, coaxial openings of different sizes to allow for interfacing with a Stirling cryocooler and Stirling generator; a polytetrafluoroethylene or glass inner chamber reduces conductive heat transfer, particularly through the dewar neck; and the dewar is fitted with an integrated, annular desiccant ring for drying low-pressure, ambient air.

In some embodiments, the inner shell, the outer shell, and the desiccant are formed (e.g., via additive manufacturing) or machined to form a unitary structure. The unitary structure may be formed from polytetrafluoroethylene.

The following examples are provided to illustrate the devices and methods of the present disclosure. The examples are merely illustrative and are not intended to limit the disclosure to the materials, conditions, or process parameters set forth therein.

Figure 1F:
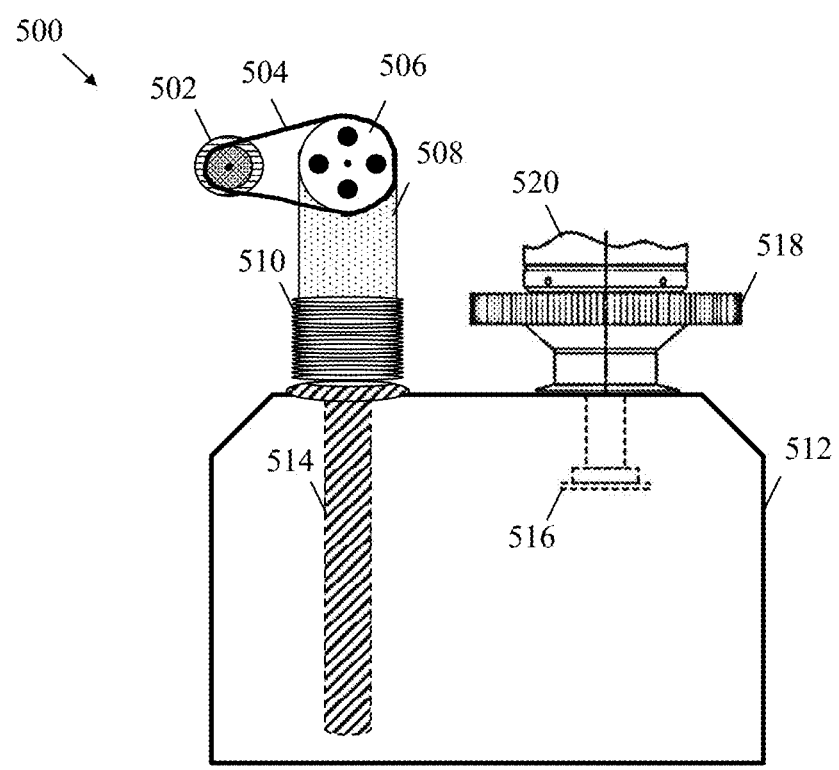
FIG. 1F is an illustration of a liquid air energy storage (LAES) system.

FIG. 1F illustrates an LAES system 500 in accordance with embodiments described herein. The primary components of the LAES system 500 include the cryocooler 520, the dewar 512, and the Stirling engine 508.

The cryocooler 520 is a contained system that takes electricity and cools the tip of a cryocooler cold head 516 to very cold temperatures. Heat is rejected through the cryocooler heat sink 518 located around the base of the cryocooler 520. In this example, the cryocooler 520 sits atop a plate on the vacuum insulated dewar 512 with only the cryocooler cold head 516 inside the dewar 512. The cold temperature at the tip of the cryocooler cold head 516 causes air to liquify and drop to the bottom of the dewar 512.

The dewar 512 is a vacuum insulated container designed to hold low-temperature liquids. This allows the liquid to be stored without immediately boiling off. A top of the dewar 512 is designed with holes large enough to fit the Stirling cold finger 514 and the cryocooler cold head 516. In some embodiments, the Stirling cold finger 514 has a 220 K temperature differential.

is an illustration of a liquid air energy storage (LAES) system. In this example, the Stirling engine 508 is a linear (beta) type that had a long, copper extension (i.e., cold finger 514) from the head of the Stirling engine 508 to the bottom of the dewar 512. This allows for heat conduction to the liquid at the bottom of the dewar 512 and improves the Stirling engine's 508 ability to operate. Above the cold finger extension 514, the Stirling engine 108 sits on a plate on top of the dewar 512, which in this example the same plate that the cryocooler 520 sits on. The hot side of the Stirling engine 508 is the Stirling heat sink 510, which sits at ambient temperature. The Stirling engine 508 rotates a pulley wheel 506 that is connected via pulley 504 to an electric generator 502. When the Stirling engine 508 operates, the electric generator 502 can spin and generate electricity.

The LAES system 500 can be configured to have various operating parameters. For example, air mass flowrates of 1-100 kg/h and pressure ratios of 5.9-7.0 can be used, which correspond to output pressures of 3000-6000 psi. These output pressures are within the range of estimates of best performing output pressures (2900-7200 psi).

EXAMPLES

Materials and Methods

Commercial off-the-shelf (COTS) components and readily available additive manufactured apparatuses were utilized to explore the evaporative performance tradespace of a dual opening dewar. This comparison was done by measuring the evaporation rate (g/min) of liquid nitrogen (LN2), which is readily commercially available, for each dewar configuration and graphing the LN2 mass versus elapsed time. To facilitate rapid, low-cost dewar experimentation, 473 mL Hydro flask Temp Shield bottles were used, which were found to have a comparable physical design to typical experimental dewars and have been shown to be efficacious in approximating their performance. These bottles contain a 1 mm thick stainless-steel outer shell, a 0.75 mm thick stainless-steel inner shell, a vacuum jacket between these shells, and physical contact between the shells only occurring at the top mouth of the bottle. The baseline bottle was modified to create an additional five experimental dewar configurations.

Figure 2A:
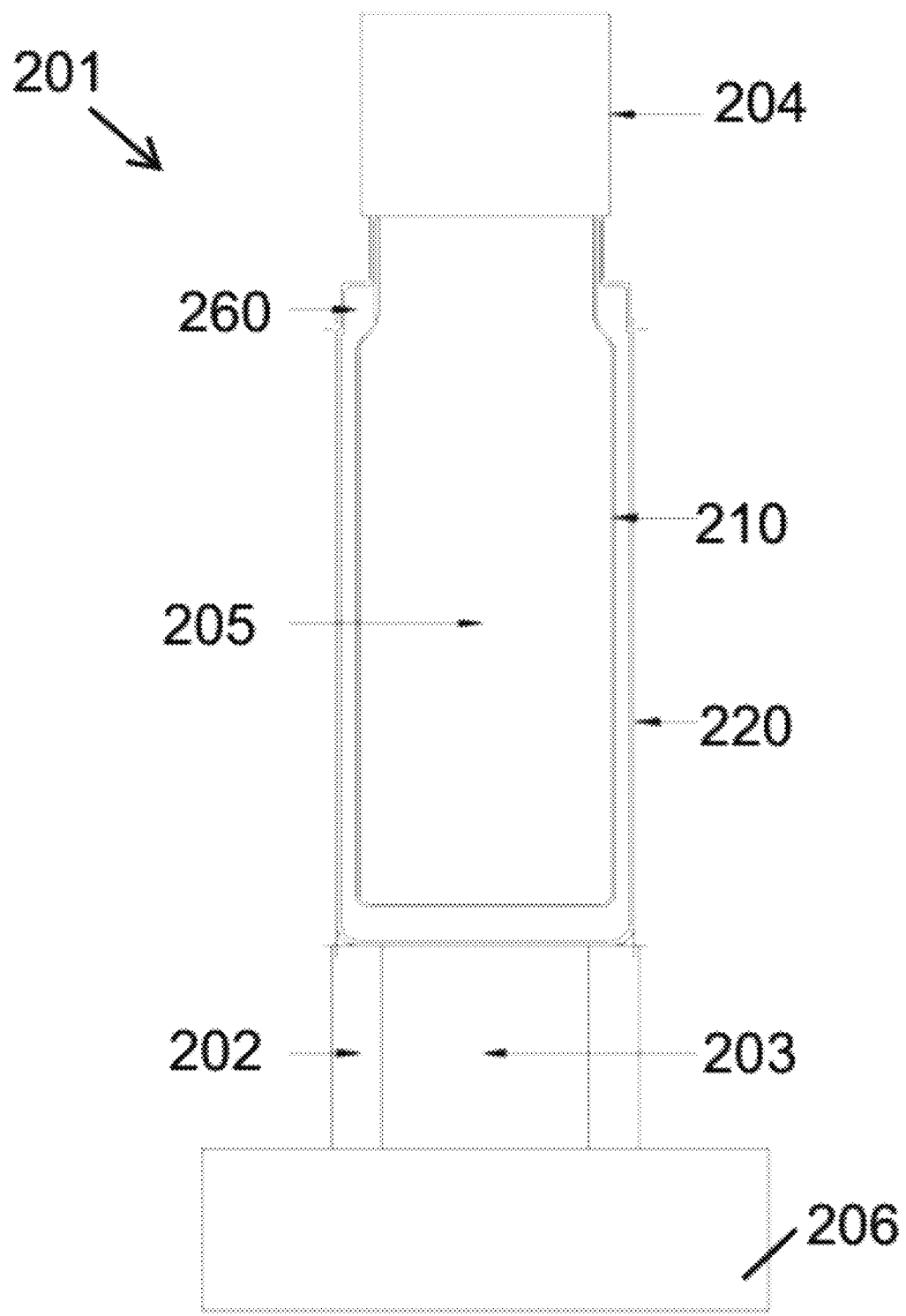
FIG. 2A illustrates a baseline experimental setup of the Examples.
Figure 2B:
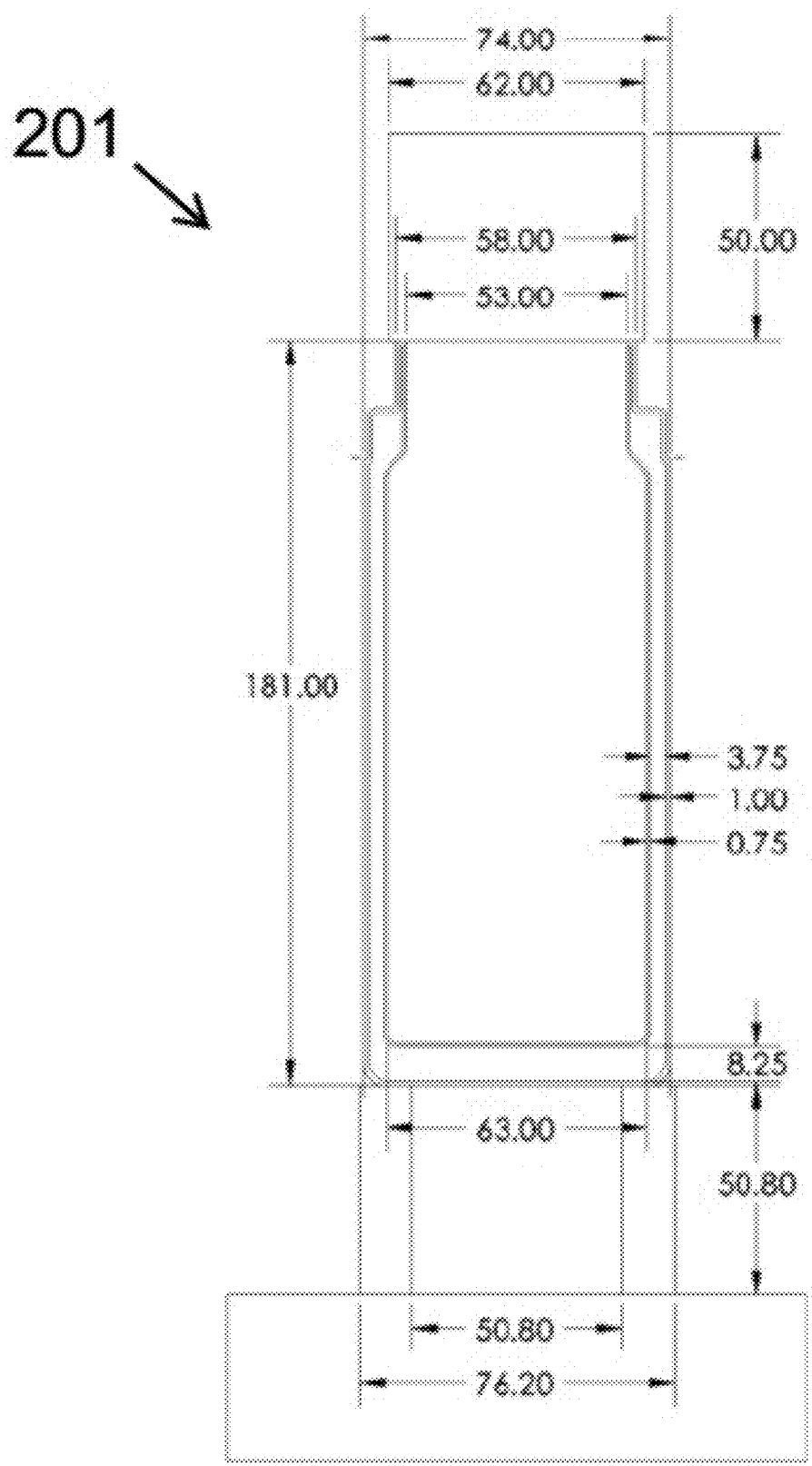
FIG. 2B illustrates the dimensions (in inches) for the baseline experimental setup of FIG. 2A.

FIG. 2A-B illustrates the basic experimental setup 201. Each flask (with inner dewar shell 210 defining a LN2 chamber 205, outer shell 220, and vacuum jacket 260 between the shells) was placed on a 3D printed polylactic acid (PLA) plastic cylinder 202 (3-inch outside diameter, 2-inch inside diameter, 2-inch height, density 0.33 g/cm$^3$). The 2-inch inner cavity of the plastic cylinder was filled with low-density polyurethane ether foam 203 (density 0.03 g/cm$^3$) to provide support for experimental dewar modifications. An additional polyurethane ether foam cylinder 204 (62 mm diameter, 50 mm height) was used to cover the mouth of the experimental dewars to limit convective heat transfer differences that might be caused by natural room air current fluctuations.

Data collection runs started with a temperature equalization step, which required filling the experimental dewar with 350 g of LN2 and allowing 300 g of the LN2 to evaporate or 1 h to elapse, whichever came first. After temperature equalization, the experimental dewar was again filled to a level of 350 g of LN2 and evaporation data was recorded and graphed between LN2 levels of 300 g to the first LN2 mass measurement of 50 g, or less, on its standard data recording cycle. The mass data recording cycle was once per minute for the modified experimental dewars and once per 10 min for the baseline, unmodified experimental configuration. To measure the change in LN2 mass, two laboratory scales 206 were used: an Ohaus CS 5000 and a Bonvoisin BCS-30. Four data runs for each experimental configuration were conducted and then averaged together. The experimental results were graphed and normalized exponential decay evaporation equations were determined using MATLAB, which approximated the various complex heat transfer mechanism taking place. Stagnant air within the experimental area was maintained to the greatest extent possible to limit airflow and changes in humidity and lighting conditions were maintained constant. Ambient temperature ranged from 20.1° C. to 21.9° C.

FIG. 3A-F illustrate various experimental configurations. The scale, PLA support cylinder, and low-density polyurethane ether foam are not shown but are used the same as in FIG. 2A during data collection runs. Specific dewar measurements are not shown but are to scale to those provided in FIG. 2B.

In FIG. 3A-F, the dewar may include a vacuum jacket 270 or no vacuum jacket 271. The bottom my be unmodified 265, include a 5/32-inch opening 266, a 1 9/64-inch opening 267, a polytetrafluoroethylene fitting 268, or a brass fitting 269.

Figure 3A:
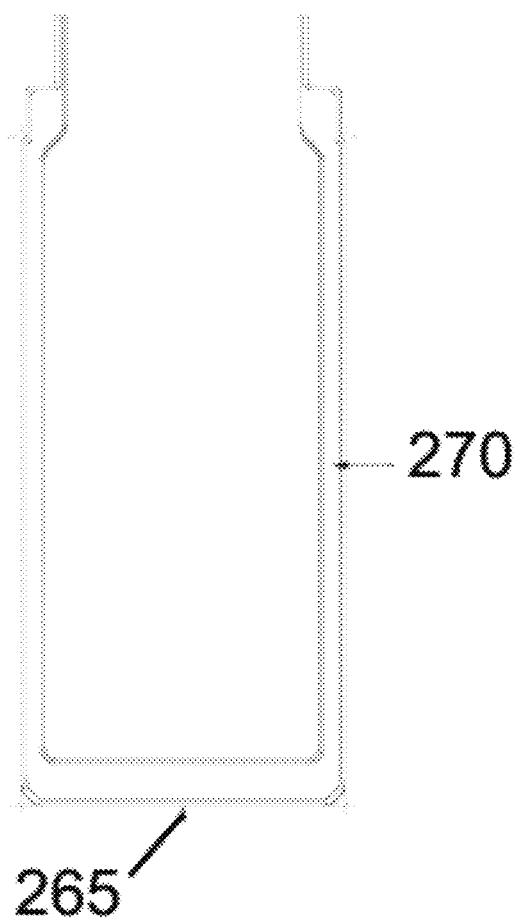
FIG. 3A-F illustrate the experimental configurations utilized in the Examples.
Figure 3B:
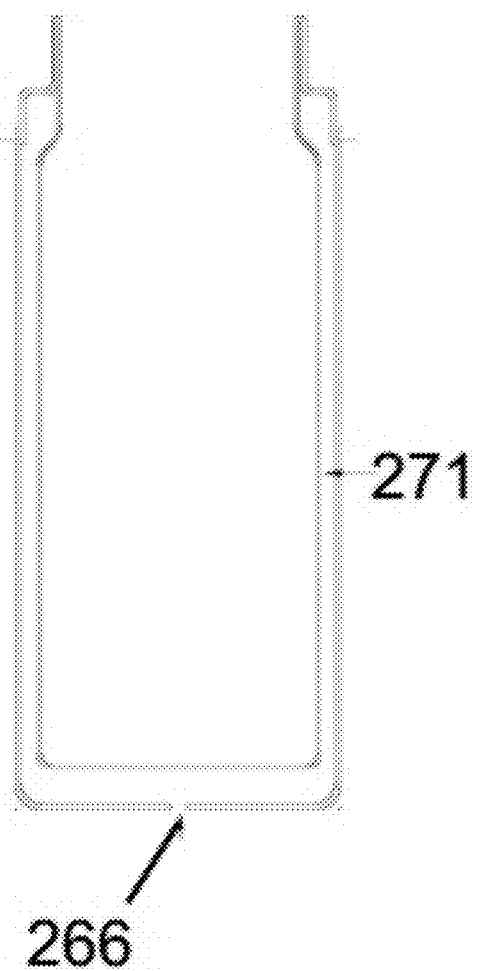
Figure 3C:
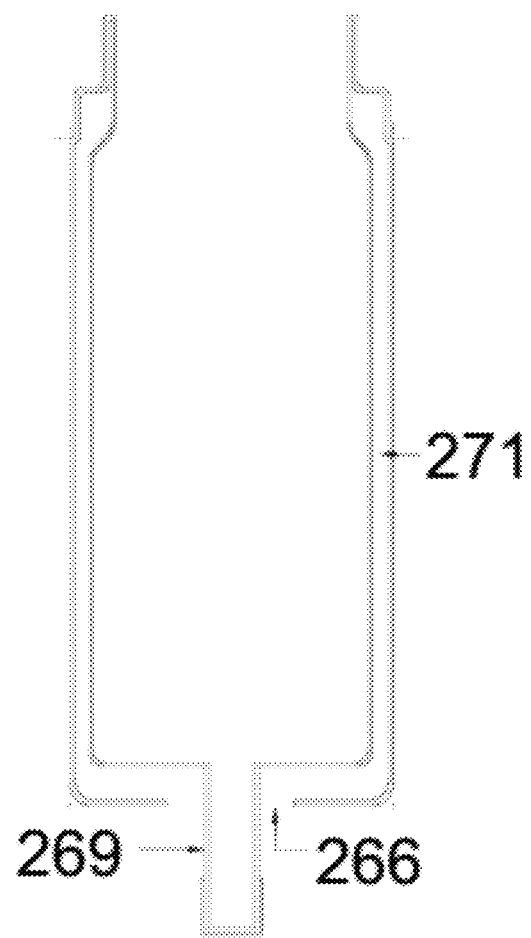
Figure 3D:
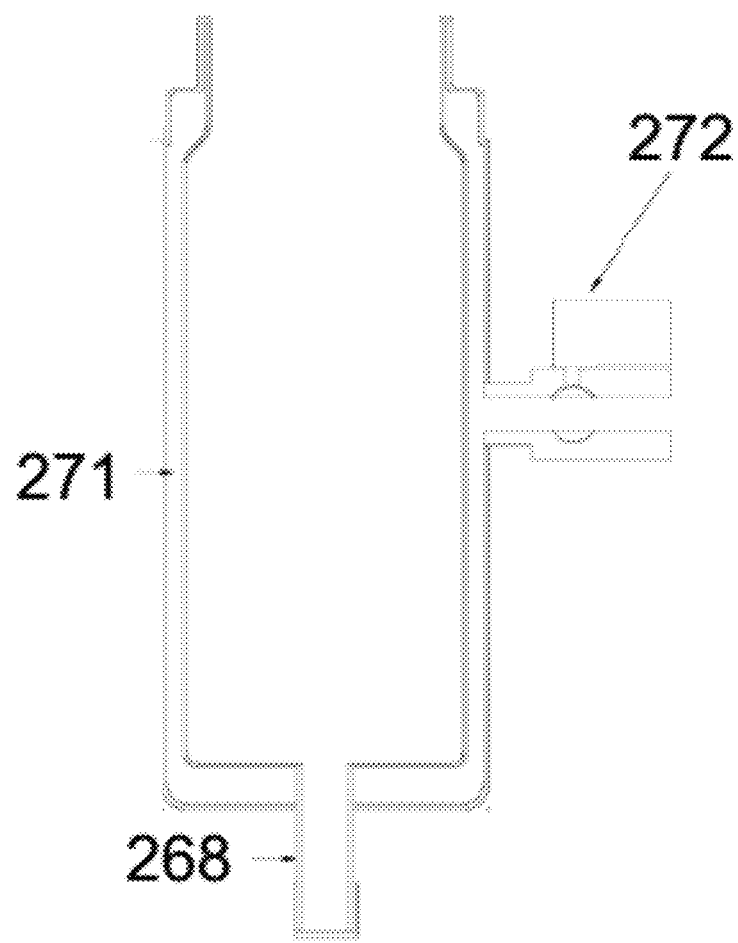
Figure 3E:
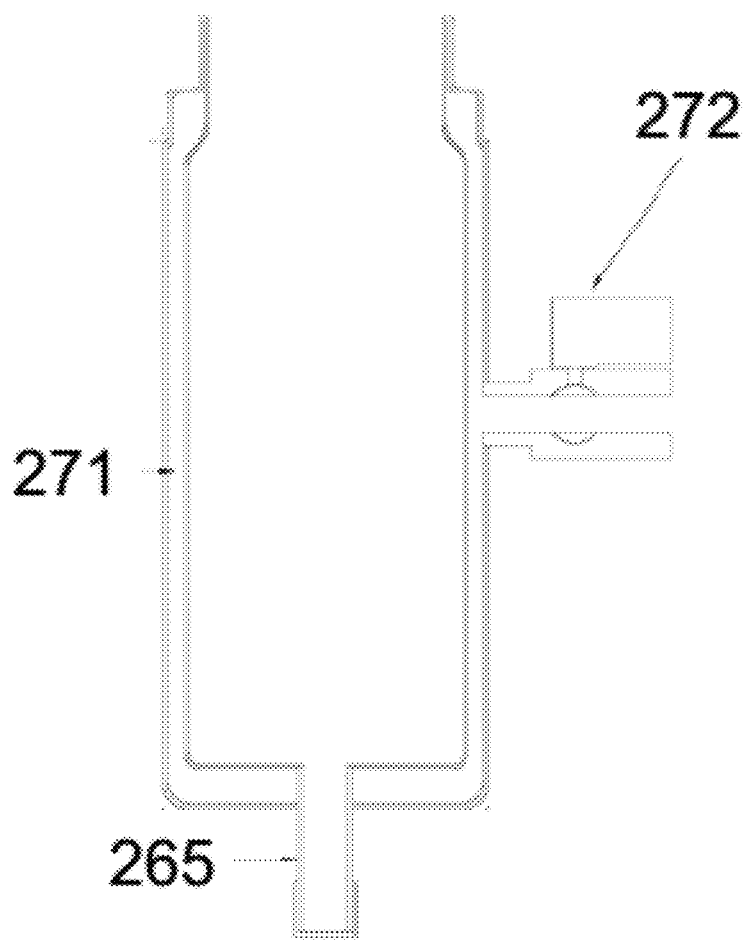
Figure 3F:
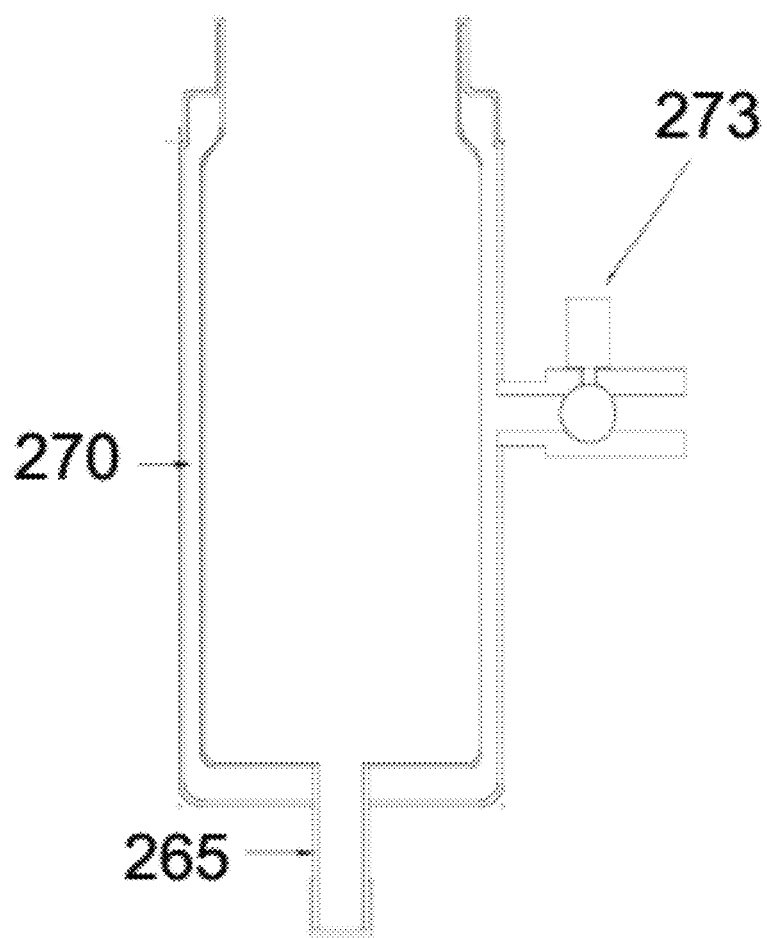

Six different experimental dewar configurations were analyzed for LN2 evaporation rates: a baseline, unmodified 473 mL Hydro Flask Temp Shield bottle (FIG. 3A); an experimental dewar configuration that modifies the baseline by removing the vacuum jacket (FIG. 3B); an experimental dewar configuration without a vacuum jacket containing a brass fitting at the bottom of the dewar that does not come in physical contact with the outer dewar shell (FIG. 3C); an experimental dewar configuration without a vacuum jacket with a polytetrafluoroethylene fitting at the bottom of the dewar (FIG. 3D); an experimental dewar configuration without a vacuum jacket and a brass fitting at the bottom of the dewar (FIG. 3E); and an experimental dewar with a vacuum jacket and a brass fitting at the bottom of the dewar (FIG. 3F). The baseline dewar configuration did not modify the physical structure of the bottle, while the five experimental dewar configurations modified this baseline in some way. The experimental dewar without a vacuum jacket modified the baseline configuration by drilling a 5/32 in (4 mm) hole into the center-bottom of the baseline bottle's outer shell. The purpose of this test configuration was to measure the effect of the vacuum jacket on LN2 evaporation rate compared to the baseline.

The experimental dewar without a vacuum jacket with a brass fitting at the bottom of the dewar that does not come in physical contact with the outer dewar shell was modified to assess the effect of conduction between the brass fitting and the outer dewar shell. A 1 9/64-inch (29 mm) hole was drilled in the center-bottom of the outer dewar shell and a ¼ in NPT threaded tap was drilled into the center-bottom of the inner shell. A 0.25-inch NPT, 1.5 inch long, brass double end threaded fitting with a 0.25-inch NPT cap on one side was threaded into the tap on the inner dewar wall and sealed with cryogenic rated Scotch-Weld Epoxy Adhesive 2216 B/A Gray. The experimental dewar with a vacuum jacket and a brass fitting at the bottom of the dewar was modified to support the bottom brass fitting and to restore the vacuum to the dewar. A 0.25-inch NPT threaded tap was drilled into the center-bottom of the dewar's inner and outer shell. A ¼ in NPT, 1.5 inch long, brass dual threaded fitting with a 0.25-inch NPT cap was threaded into this tap and sealed with cryogenic rated Scotch-Weld Epoxy Adhesive 2216 B/A Gray. A 0.25-inch NPT hole was drilled into the outer dewar wall 90 mm from the base, allowing for a 0.25-inch NPT brass vacuum ball valve 272 and 273 to be installed with a ¼ in brass barbed hose fitting. This facilitated a 29.9 in Hg vacuum to be drawn between the inner and outer dewar shells. Scotch-Weld Epoxy Adhesive 2216 B/A Gray was used to seal the vacuum ball valve 272 and 273 to the outer dewar wall. This configuration allowed for the assessment of LN2 evaporation rate due to the conductive effects through the installed brass fitting to the outer dewar wall. This same experimental dewar configuration was also used to determine the LN2 evaporation rate without a vacuum by maintaining the brass vacuum ball valve 272 and 273 open. The experimental dewar without a vacuum jacket and a polytetrafluoroethylene fitting at the bottom of the dewar was modified in the same way as the dewar with a vacuum jacket and a brass fitting, except a polytetrafluoroethylene fitting of the same dimensions as the brass fitting was used; however, a constant vacuum could not be maintained using the polytetrafluoroethylene fitting. This configuration enabled assessing the use of a polytetrafluoroethylene, vice brass, fitting material on LN2 evaporation rate. This was done because polytetrafluoroethylene has a lower heat transfer coefficient than brass, which was hypothesized to lower convective heat losses to the outer dewar shell compared to an equivalent configuration using brass. These six experimental configurations are summarized in Table 1 (below).

TABLE 1

| Experimental Dewar Configuration | Description |
| --- | --- |
| A | Baseline 473 mL Hydro Flask TempShield bottle-Dewar with no modification. Contains a vacuum jacket. |
| B | Modified baseline bottle-Dewar with a hole in the bottom outer shell and no vacuum jacket. |
| C | Modified baseline bottle-Dewar with a hole in the bottom outer and inner shells, a bottom mounted capped brass fitting that does not have metal-metal conduction to the outer bottle-Dewar shell, and no vacuum jacket. |
| D | Modified baseline bottle-Dewar with a capped threaded Teflon fastener penetrating the bottom outer and inner shells with no vacuum jacket. |
| E | Modified baseline bottle-Dewar with a capped threaded brass fastener penetrating the bottom outer and inner shells with no vacuum jacket. |
| F | Modified baseline bottle-Dewar with a capped threaded brass fastener penetrating the bottom outer and inner shells with a vacuum jacket. |

The performance of each experimental dewar is based on the dewar's rate of LN2 evaporation, with higher evaporation rates being considered worse performance and lower evaporation rates being considered better. Experimental dewar configuration F had the lowest evaporation rate among the modified dewars, evaporating from 300 g of LN2 to 48 g of LN2 in 69 min. Aside from the baseline experimental dewar configuration A, which evaporates from 300 g to 49 g of LN2 in 570 min, configuration F was the only dewar configuration which contained a vacuum jacket. This highlights the importance of a vacuum jacket with regard to dewar performance. Despite this enhanced performance compared to the other modified dewar configurations, the holding time of LN2 for dewar configuration F is only 12.1% of the baseline dewar, configuration A. This is due to conduction directly to the outer dewar shell via the brass fitting, which in turn increases the convective heat transfer to the atmospheric air in contact with the outer dewar shell. The worst performing experimental dewar was configuration E, which had 253.5 g of LN2 evaporate in 46 min. The difference between this configuration and configuration F was that the vacuum port for configuration E was opened to remove the vacuum jacket. The removal of the vacuum allowed air to be in the vacuum space, dramatically increasing the convection taking place between the inner dewar shell to the outer dewar shell.

Additionally, gaseous airflow can occur at the opening of the vacuum ball valve 272 and 273, meaning an increase in convective heat transfer occurs as warm air is permitted to more freely flow into the gap between the dewar shells. This performance drop between the best and worst performing configurations once again emphasizes the importance of a vacuum jacket between dewar shells to reduce thermal convective and conductive losses, as the physical design was exactly the same and only the presence of a vacuum differentiated these two configurations.

The second best performing experimental dewar was configuration D, which saw 251.5 g of LN2 evaporate in 65 min. Two differences existed between this configuration and configuration F. First, no vacuum jacket existed, with air being permitted to freely flow into and out of the vacuum ball valve 272 and 273, increasing the convective and conductive losses in the same way as discussed concerning Configuration E. Second, the brass fitting at the bottom of the experimental dewar was replaced with a polytetrafluoroethylene one of the same dimensions. Compared to the worst performing dewar, configuration E, the only difference between them was this fitting material at the bottom of the dewar. The combination of this information confirms that replacing the high thermal conductivity brass fitting with a lower conductivity material improves performance of a dual opening dewar design by reducing conductive losses to the outer dewar shell. The evaporation curve for configuration D is also revealing. Compared to configurations B, C, E, and F, the slope of the curve levels out faster as the volume of LN2 decreases. This is likely caused by an increasing amount of conductive surface area in contact with the LN2 being polytetrafluoroethylene as the LN2 level lowers, versus being the stainless-steel or brass that is present in the other modified experimental dewar configurations. It is assumed that if configuration D was manufactured to hold a vacuum, such as configuration F, then the combination of a polytetrafluoroethylene fitting and a vacuum jacket would prove to have better performance than configuration F.

Configuration C had the third best performance, with LN2 evaporating from 300 g to 49.5 g in 56 min. This configuration removed metal-to-metal conduction between brass fitting and stainless-steel outer dewar shell by removing a stainless-steel ring around the brass fitting. Though this configuration sacrifices being able to restore a vacuum to the dewar, it still had better performance than dewar configuration E; thus, it is confirmed that the metal-to-metal conduction at the brass fitting interface is greater than the conduction of the brass-air-stainless steel interface produced. Despite this finding, it is still more advantageous to restore a vacuum jacket to the dewar. Experimental dewar configuration B had the second worst performance, evaporating 250.5 g of LN2 in 48 min. This configuration merely removed the vacuum from between the inner and outer dewar shells and did not add any brass fittings. Dewar configuration had a similarly sized hole via the vacuum ball valve 272 and 273 and barbed hose fitting, but also had the brass fitting protrude from the outer dewar shell. The lack of this protrusion for configuration B likely accounts for its slightly better performance than configuration E. Normalized exponential decay evaporation curve fit equations for each of the experimental dewar Configurations were found using $$y=(a)e^{-bx}+(c)e^{-dx}$$

where y is the normalized mass of LN2, x is the normalized elapsed experimental evaporation time, and a, b, c, and d are coefficients. Normalization was based on a 300 g LN2 initial mass and the associated evaporation time for a given experimental dewar configuration. Table 2 (below) contains the normalized evaporation equations and their associated R2 value, as well as the final LN2 mass and evaporation time for each experimental dewar configuration.

TABLE 2

| Experimental Dewar Configuration | Normalized Evaporation Equation and $R^2$ Value | Final LN2 Mass (g) | Evaporation Time (min) |
|---|---|---|---|
| A | $y = 1.147e^{-0.8685x} - 0.1477e^{0.7679x}$ $R^2 = 1.0000$ | 49.0 | 570 |
| B | $y = 1.081e^{-1.121x} - 0.08338e^{0.811x}$ $R^2 = 1.0000$ | 49.5 | 48 |
| C | $y = 1.102e^{-1.07x} - 0.1056e^{0.7096x}$ $R^2 = 1.0000$ | 49.5 | 56 |
| D | $y = 1.045e^{-1.317x} - 0.04467e^{0.967x}$ $R^2 = 1.0000$ | 48.5 | 65 |
| E | $y = 1.207e^{-0.9559x} - 0.2102e^{0.3818x}$ $R^2 = 1.0000$ | 46.5 | 46 |
| F | $y = 1.231e^{-0.9628x} - 0.2302e^{0.2965x}$ $R^2 = 1.0000$ | 48.0 | 69 |

The LN2 storage performance of experimental dewar configuration F is only 12.1% that of the baseline dewar, configuration A. Despite the vacuum jacket greatly minimizing conduction through the vacuum space between the inner and outer dewar shells, the increase in conduction between the bottom fittings and the outer dewar shell, as well as the air and insulating foam around the producing fitting, greatly reduces the efficacy of LN2 storage, making the configuration F inappropriate for a system designed to produce LA in the container for later use on a small-scale remote, islanded, renewable microgrid. This is because these microgrids typically require the use of their stored within a day after production, such as during the night for solar power-based microgrids. Despite this configuration F could be useful as a LA receiving vessel for a Stirling generator connected to the bottom port. This is because the energy lost at the bottom port is primarily conductive in nature and could be converted into electrical energy through an attached Stirling generator, with further energy recovery improvements possible by combining the Stirling generator with low temperature optimized thermoelectric generators (TEGs) on the outer dewar shell. The performance improvement gained by using a polytetrafluoroethylene fitting in Configuration D, compared to the brass fitting used in configuration E, provides sufficient evidence that replacing additional metallic dewar material with polytetrafluoroethylene may prove to further improve the dual opening dewar design. If manufacturing of this polytetrafluoroethylene-based dewar can also support a vacuum jacket, then performance should exceed that of configuration F, the best performing modified dewar.

Figure 4:
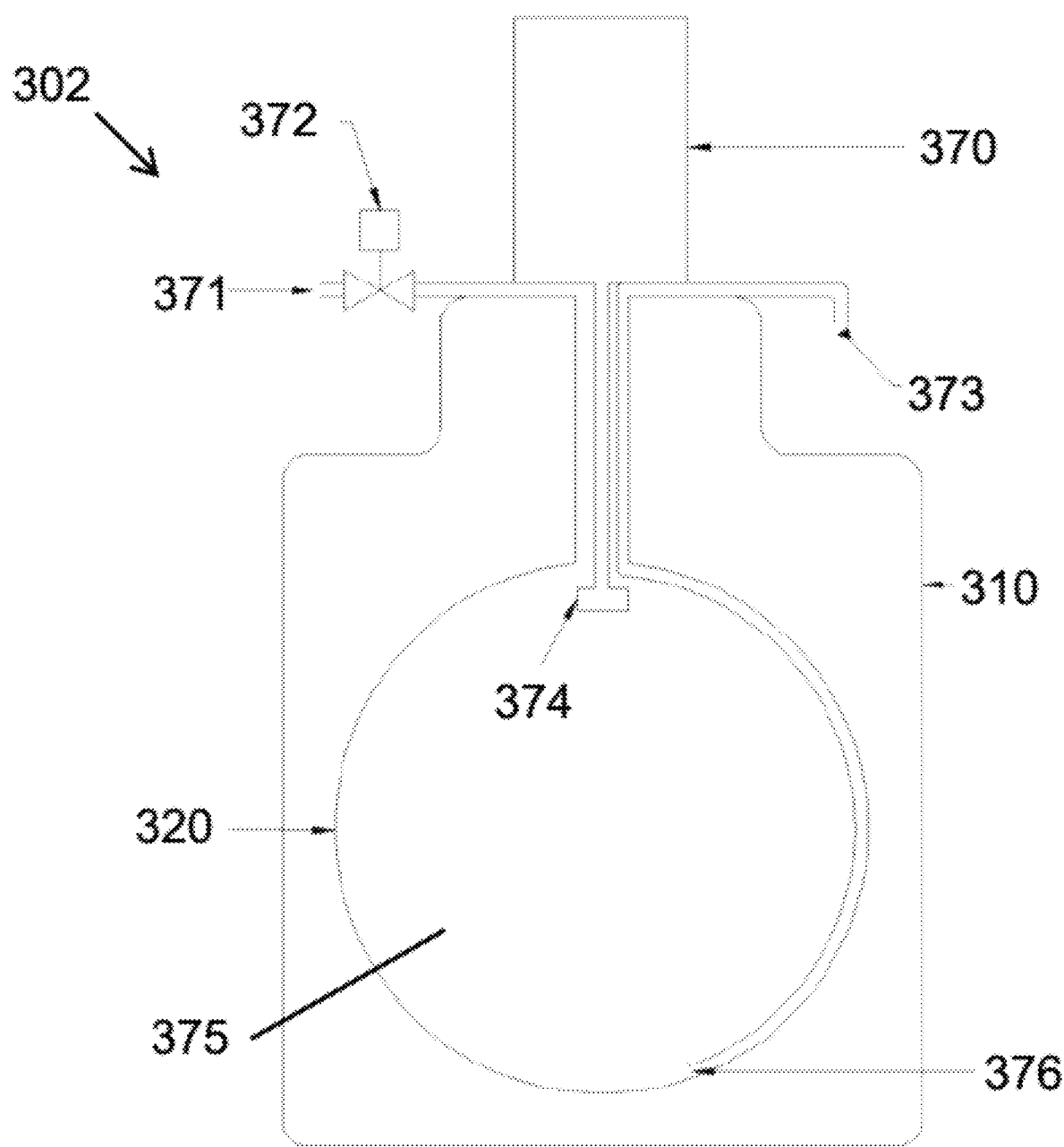
FIG. 4 is a schematic view of a non-limiting embodiment of a storage dewar.

This dual opening dewar design may be effective for the shorter-term LA holding required by processes that take advantage of immediate thermal energy conversion to electrical energy. These processes include a connected Stirling generator, a TEG, or a combination of these electrical energy production devices that take advantage of the thermal losses at the bottom opening. Further investigation may result in other uses for this system, such as controlled cooling of components. Additionally, the replacement of metallic portions of the dual opening dewar with lower thermal conductivity material, such as polytetrafluoroethylene or glass, coupled with a vacuum jacket should be explored to further improve the performance of this dual opening design. It is recommended that a COTS dewar is developed and tested that is modified to allow for self-pressurization to low-pressures, allowing for LA transport from this high performance COTS dewar to a separate power recovery subsystem that is not in continuous contact with the stored LA medium. This power recovery subsystem could utilize the vacuum jacketed dual opening dewar design (i.e., Configuration F) presented in this work for immediate electrical power recovery from the LA via a connected Stirling generator, TEG, or combination of these devices Alternative Design An alternative design is illustrated in FIG. 4. This system 302 uses a COTS storage dewar (including an outer shell 310 and an inner shell 320) with a cryocooler 370 connected to the top of the dewar's neck. An elongated displacer chamber, or equivalent, would extend the coldfinger 374 of the cryocooler below the bottom of the neck and into the main storage volume 375 of the dewar, allowing for effective production of LA. It is proposed that the cryocooler make a pressure-tight connection with the dewar upper opening except for two ports for connected tubing. One of these ports requires connection to a short tube to act as an air vent of the dewar, allow for air to enter the dewar for liquification during cryocooler operation and to prevent overpressure during normal LA storage. This vent 371 would have a normally open electrical solenoid valve 372 attached to it such that when the valve is energized and shuts the upper portion of the dewar can be pressurized. Normal evaporation of LA in the dewar would naturally increase its pressure. As pressure increases it forces the LA to travel through a low thermal conductivity tube 376, such as polytetrafluoroethylene, that travels from the bottom of the LA storage volume and passes through the second port 373 at the dewar neck to a power recovery phase. This tube would act as a smaller, secondary neck of the dewar, meaning it would slightly increase conductive losses via the neck opening, though this is likely minimal. Once a sufficient volume of LA has been delivered to the power recovery component, the solenoid valve would deenergize, reliving the internal pressure of the dewar and allowing the LA to continue long-term, efficient storage.

This LA storage dewar configuration takes advantage of modern, optimized unpressurized dewar design elements, which will allow for longer LA storage times while also leveraging natural evaporative processes to facilitate the resultant pressure increase to transport LA from storage to a power recovery cycle. This design does add a small, periodic electrical load via the solenoid valve compared to a design that must only intermittently operate a cryocooler. Since both the cryocooler and solenoid valve must be operated with any microgrid configuration integrating this LAES system, a control system for them may be in place. This control system would likely be able to integrate with the control logic that already exists for the microgrid, but the additional electrical load they draw must be accounted for in determining the net electrical power that would be recoverable by this design.

This written description uses examples to describe the disclosure, including the best mode, and also to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A system using a dewar, the system comprising:
a cryocooler to cool a tip of a cold head to cryogenic temperatures, the cryocooler further comprising:
a heat sink to reject heat from the cryocooler,
a cold head that protrudes into the dewar through an upper cryocooler cavity, the cold head to condense ambient air to create liquified air in the dewar;
the dewar to hold the liquified air at low temperatures, the dewar having the cryocooler cavity and a Stirling cavity that are coaxial, wherein the dewar further comprises:
a polytetrafluoroethylene or glass inner shell that reduces conductive heat transfer through a neck of the dewar, and
an integrated, annular ring fitted in the cryocooler cavity and filled with desiccant, the integrated, annular ring for drying low-pressure, ambient air; and
a Stirling engine to drive an electronic generator, the Stirling engine further comprising:
a cold finger protruding into the dewar through the lower Stirling cavity, the cold finger to move the liquified air from the dewar to a Stirling heat sink,
the Stirling heat sink to expand the liquified air and to drive the electronic generator, and the electronic generator to generate output electricity.

2. The system of claim 1, wherein the inner shell is covered with a metal layer.

3. The system of claim 1, wherein an air gap between the inner shell and an outer shell is maintained.

4. The system of claim 1, wherein the dewar further comprises a high thermal conductivity plug at the lower Stirling cavity.

5. The system of claim 1, wherein the dewar further comprises first air holes in an outer shell at the integrated, annular ring and second air holes in the inner shell at the integrated, annular ring.

6. A dewar comprising:
a top opening;
a bottom opening;
an inner shell that reduces conductive heat transfer, wherein the inner shell comprises polytetrafluoroethylene or glass;
an outer shell;
a gap between the inner shell and the outer shell;
a desiccant ring;
an upper cryocooler cavity; and
a Stirling cavity;
the upper cryocooler cavity and the Sterling cavity are coaxial.

7. The dewar of claim 6, wherein the desiccant ring extends around an upper lip, and wherein the upper lip is a polytetrafluoroethylene or glass lip above a polytetrafluoroethylene or glass shelf.

8. The dewar of claim 6, further comprising:
a polytetrafluoroethylene or glass disk extending around the bottom opening.

9. The dewar of claim 6, wherein the inner shell comprises polytetrafluoroethylene.

10. The dewar of claim 6, wherein the inner shell comprises glass.

11. The dewar of claim 6, wherein the desiccant ring comprises silica beads.

12. The dewar of claim 6, wherein the outer shell comprises polytetrafluoroethylene.

13. The dewar of claim 6, wherein the outer shell comprises steel.

14. A system comprising:
a dewar comprising:
a top opening;
a bottom opening;
an inner shell that reduces conductive heat transfer, wherein the inner shell comprises polytetrafluoroethylene or glass;
an outer shell;
a gap between the inner shell and the outer shell;
a desiccant ring;
an upper cryocooler cavity; and
a Stirling cavity;
the upper cryocooler cavity and Stirling cavity are coaxial;
a cryocooler associated with the top opening; and
an electronic generator associated with the bottom opening.

15. The system of claim 14, wherein the cryocooler is a Stirling cryocooler.

16. The system of claim 14, wherein the electric generator is a Stirling generator or a thermoelectric generator.

17. The system of claim 14, wherein the desiccant ring extends around a polytetrafluoroethylene or glass lip above a polytetrafluoroethylene or glass shelf.

18. The system of claim 17, wherein the inner shell, the outer shell, the lip, and the shelf comprise polytetrafluoroethylene and are a unitary structure.

19. The system of claim 18, wherein the gap is a vacuum gap.

* * * * *